(12) United States Patent
Mann et al.

(10) Patent No.: US 8,777,046 B2
(45) Date of Patent: Jul. 15, 2014

(54) DRINK CUP WITH ROLLED BRIM

(75) Inventors: Jeffrey A. Mann, Evansville, IN (US);
Milan C. Maravich, Newburgh, IN (US); Chris Bolek, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 13/268,206

(22) Filed: Oct. 7, 2011

(65) Prior Publication Data

US 2012/0132699 A1 May 31, 2012

Related U.S. Application Data

(60) Provisional application No. 61/391,384, filed on Oct. 8, 2010.

(51) Int. Cl.
*B65D 1/42* (2006.01)

(52) U.S. Cl.
USPC .......................................... 220/658; 220/641

(58) Field of Classification Search
USPC ......... 220/656, 657, 645, 634, 633, 658, 659, 220/640, 641; 229/400
See application file for complete search history.

(56) References Cited

U.S. PATENT DOCUMENTS

| | | | |
|---|---|---|---|
| 203,328 A * | 5/1878 | Edgar | 220/658 |
| 530,439 A * | 12/1894 | Miller | 220/615 |
| 1,707,655 A * | 4/1929 | Cohn | 220/573.1 |
| 1,712,864 A * | 5/1929 | Willson | 220/641 |
| 1,773,278 A * | 8/1930 | Reid | 220/615 |
| 1,795,489 A * | 3/1931 | Hothersall | 220/309.2 |
| 1,910,426 A * | 5/1933 | Courtright | 220/309.2 |
| 2,521,098 A * | 9/1950 | Sebell | 220/276 |
| 2,763,422 A * | 9/1956 | Oakes | 220/641 |
| 2,764,136 A * | 9/1956 | Gadd | 184/106 |
| 2,774,509 A * | 12/1956 | Knobloch | 220/655 |
| 2,833,324 A * | 5/1958 | Burroughs | 220/790 |
| 2,869,753 A * | 1/1959 | Jankowski | 220/641 |
| 2,905,350 A * | 9/1959 | Edwards | 215/373 |
| 2,993,636 A * | 7/1961 | Aldington | 229/404 |
| 3,079,027 A * | 2/1963 | Edwards | 206/519 |
| 3,099,377 A * | 7/1963 | Metzler et al. | 229/406 |
| 3,137,409 A * | 6/1964 | Davis | 220/380 |
| 3,208,626 A * | 9/1965 | Scaletta et al. | 220/270 |
| 3,268,143 A * | 8/1966 | Bolcato | 229/400 |
| 3,291,361 A * | 12/1966 | Commeyras | 229/400 |
| 3,327,895 A * | 6/1967 | Mueller | 206/519 |
| 3,353,708 A * | 11/1967 | Davis | 206/519 |
| 3,358,879 A * | 12/1967 | Mueller | 206/519 |
| 3,378,164 A * | 4/1968 | Witzgall | 220/643 |
| 3,395,486 A * | 8/1968 | Campbell et al. | 47/65.7 |
| 3,396,868 A * | 8/1968 | Fitzgerald | 206/508 |
| 3,437,253 A * | 4/1969 | McDonald et al. | 229/400 |
| 3,441,192 A * | 4/1969 | Metzler et al. | 229/400 |
| 3,520,441 A * | 7/1970 | Fitzgerald | 206/519 |
| 3,529,743 A * | 9/1970 | Ehrbar et al. | 220/659 |
| 3,669,305 A * | 6/1972 | Kinney et al. | 220/203.09 |
| 3,672,536 A * | 6/1972 | Kinney et al. | 220/203.09 |
| 3,817,420 A * | 6/1974 | Heisler | 220/790 |
| 3,836,063 A * | 9/1974 | Sutch | 229/400 |

(Continued)

*Primary Examiner* — Fenn Mathew
*Assistant Examiner* — Christopher McKinley
(74) *Attorney, Agent, or Firm* — Barnes & Thornburg LLP (57) ABSTRACT

A drink cup includes a body formed to include an interior fluid-storage region and a brim. The brim is coupled to the body to surround an opening into the interior fluid-storage region.

19 Claims, 5 Drawing Sheets

(56) References Cited

U.S. PATENT DOCUMENTS

| | | | | |
|---|---|---|---|---|
| 3,846,207 A * | 11/1974 | MacDaniel et al | ......... | 156/443 |
| 3,892,351 A * | 7/1975 | Johnson et al. | ......... | 206/508 |
| 3,896,587 A * | 7/1975 | Insalaco | ......... | 47/65.5 |
| 4,029,232 A * | 6/1977 | Mania | ......... | 220/641 |
| 4,051,951 A * | 10/1977 | Smith | ......... | 206/508 |
| 4,130,234 A * | 12/1978 | Schmidt | ......... | 229/400 |
| 4,344,546 A * | 8/1982 | Dry | ......... | 220/320 |
| 4,380,301 A * | 4/1983 | Eisman | ......... | 220/641 |
| 4,578,296 A * | 3/1986 | Miyazaki et al. | ......... | 428/36.4 |
| 4,610,351 A * | 9/1986 | Coles et al. | ......... | 206/217 |
| 4,651,892 A * | 3/1987 | Boersma | ......... | 220/320 |
| 4,742,935 A * | 5/1988 | Schellenberg | ......... | 220/791 |
| 4,787,530 A * | 11/1988 | Edwards | ......... | 220/266 |
| 4,867,313 A * | 9/1989 | Padovani | ......... | 206/519 |
| 4,872,586 A * | 10/1989 | Landis | ......... | 220/781 |
| 4,938,051 A * | 7/1990 | Duffy et al. | ......... | 72/356 |
| 5,086,944 A * | 2/1992 | Duffy et al. | ......... | 220/658 |
| 5,184,995 A * | 2/1993 | Kuchenbecker | ......... | 493/79 |
| 5,226,586 A * | 7/1993 | Grone | ......... | 229/400 |
| 5,431,619 A * | 7/1995 | Bacon et al. | ......... | 493/158 |
| 5,472,402 A * | 12/1995 | Aloisi et al. | ......... | 493/158 |
| 5,544,808 A * | 8/1996 | Aloisi et al. | ......... | 229/400 |
| 5,644,867 A * | 7/1997 | Gay | ......... | 47/71 |
| 5,729,914 A * | 3/1998 | Aloisi et al. | ......... | 34/541 |
| 5,752,646 A * | 5/1998 | Sandstrom | ......... | 229/4.5 |
| 5,868,309 A * | 2/1999 | Sandstrom et al. | ......... | 229/400 |
| 5,934,472 A * | 8/1999 | Ramirez et al. | ......... | 206/557 |
| 5,954,624 A * | 9/1999 | Sandstrom | ......... | 493/158 |
| 6,010,062 A * | 1/2000 | Shimono | ......... | 229/400 |
| 6,158,233 A * | 12/2000 | Cohen et al. | ......... | 62/268 |
| 6,168,044 B1 * | 1/2001 | Zettle et al. | ......... | 220/784 |
| 6,708,839 B2 * | 3/2004 | Diesterbeck | ......... | 220/782 |
| 6,845,877 B2 * | 1/2005 | Diesterbeck | ......... | 220/782 |
| 6,866,905 B1 * | 3/2005 | Sandstrom et al. | ......... | 428/34.1 |
| 6,976,604 B2 * | 12/2005 | Connors et al. | ......... | 220/713 |
| 7,204,056 B2 * | 4/2007 | Sieverding | ......... | 47/65.5 |
| 7,318,536 B2 * | 1/2008 | Maravich et al. | ......... | 220/780 |
| 7,703,626 B2 * | 4/2010 | Witt | ......... | 220/276 |
| 7,735,674 B2 * | 6/2010 | Cai | ......... | 220/324 |
| 7,922,028 B2 * | 4/2011 | Baltz | ......... | 220/657 |
| 7,975,871 B2 * | 7/2011 | Wnek et al. | ......... | 220/643 |
| 8,091,732 B2 * | 1/2012 | Bryson et al. | ......... | 220/792 |
| 8,181,819 B2 * | 5/2012 | Burney et al. | ......... | 220/792 |
| 8,286,826 B2 * | 10/2012 | Connors et al. | ......... | 220/780 |
| 2004/0011803 A1 * | 1/2004 | D'Amato | ......... | 220/780 |
| 2004/0084459 A1 * | 5/2004 | Brown et al. | ......... | 220/659 |
| 2008/0029525 A1 * | 2/2008 | Rasanen et al. | ......... | 220/658 |

* cited by examiner

FIG. 6

DRINK CUP WITH ROLLED BRIM

PRIORITY

This application claims priority under 35 U.S.C. §119(e) to U.S. Provisional Application Ser. No. 61/391,384, filed Oct. 8, 2010, which is expressly incorporated by reference herein.

BACKGROUND

The present disclosure relates to containers, and particularly to drink cups. More particularly, the present disclosure relates to a drink cup having a brim.

SUMMARY

A drink cup in accordance with the present disclosure includes a body and a brim. The body is formed to include an interior region providing a fluid-holding reservoir and the brim is coupled to the body to frame an opening into the interior region.

In illustrative embodiments, the brim is a rolled brim including an annular lip and an annular ridge. The annular lip is coupled to an upper portion of the body and arranged to lie outside of the interior region and surround the upper portion of the body to define a downwardly opening ridge-receiving chamber therebetween. The annular ridge is coupled to an inner lip wall of the annular lip and arranged to lie in the downwardly opening rigid-receiving chamber to provide pivot means for establishing a pivot about which the annular lip is rolled during exposure of the annular lip to a progressive die as a container comprising the body, annular lip, and annular ridge is run through the progressive die to produce the drink cup so that an outer lip wall that is included in the annular lip and that is arranged to face outwardly away from the inner lip wall of the annular lip has a round shape.

In illustrative embodiments, the annular lip terminates at a distal end and includes a first segment coupled to the upper portion of the body, a third segment configured to include the distal end, and a second segment arranged to interconnect the first and third segments and coupled to the annular ridge. The annular ridge is arranged to extend away from the inner lip wall of the annular lip and into the ridge-receiving chamber. Each of the first, second, and third segments is bounded by a convex curved outer surface and the convex curved outer surfaces of the first, second, and third segments cooperate to define the outer lip wall characterized by the round shape.

A process in accordance with the present disclosure comprises the steps of forming a container having a body and an unrolled brim coupled to a top end of the body and then converting the container into a drink cup having a rolled brim at a brim-former station. In an illustrative process, an annular lip coupled to the top end of the body is rolled about a pivot established by an annular ridge coupled to an inner lip wall of the annular lip to form a rolled brim including an outer lip wall having a round shape.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 4A-5 are a series of views showing a drink-cup manufacturing process in accordance with the present disclosure;

FIG. 4A is a perspective view of a container-manufacturing process in accordance with the present disclosure showing that the process comprises the steps of extruding a continuous sheet made of a plastics material, heating the sheet, molding the sheet into a continuous molded sheet including a flat container-carrier sheet and a set of containers coupled to the container-carrier sheet, stamping the molded sheet to separate the containers from the container-carrier sheet, accumulating the containers to produce several stacks of nested individual containers, and transporting each stack to a rolled-brim former station shown in FIG. 5;

FIG. 4B is an enlarged sectional view taken along line 4B-4B of FIG. 4A after the extruded sheet shown in FIG. 4A has been positioned in a mold cavity formed between an upper female mold core and a lower male mold core shown in FIG. 4A and the cores have been moved toward one another to form therebetween the set of individual containers and the container-carrier sheet coupled to those containers;

FIG. 5 is a perspective view of a brim-forming process in accordance with the present disclosure showing a stack of nested containers moving through the brim-forming process suggested in FIG. 4A and suggesting that a brim-former machine including a pair of rotating spindles draws the stack of nested containers through the machine to cause a rolled brim to be formed progressively on each container by rolling an annular lip included in the container about an adjacent annular ridge also in the container to produce a drink cup having a rolled brim;

DETAILED DESCRIPTION

Figure 1:
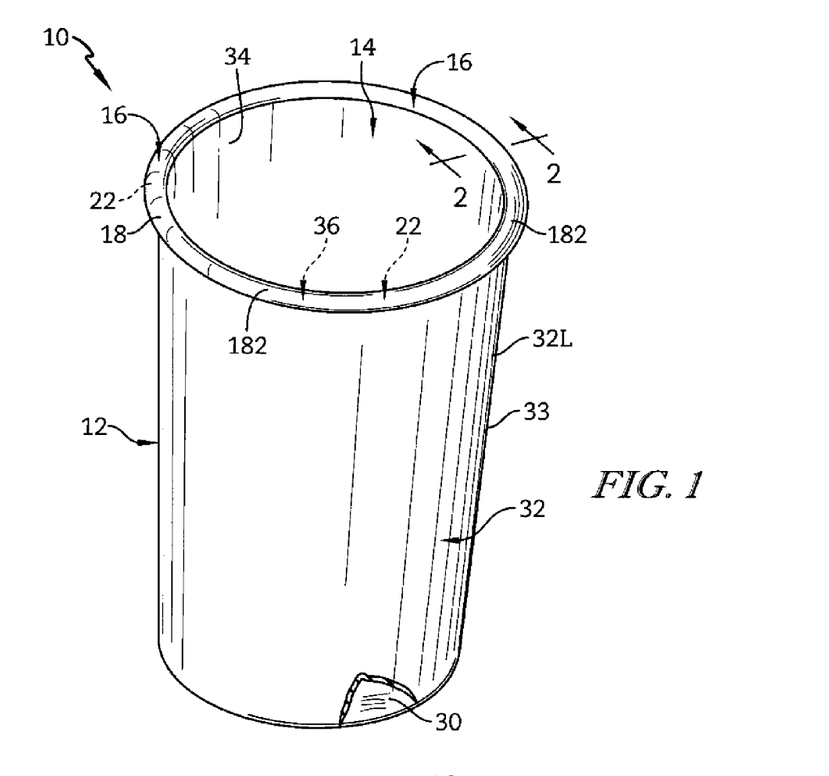
FIG. 1 is a perspective view of a first embodiment of a drink cup in accordance with the present disclosure showing a drink cup including a body formed to include an interior region and a rolled brim coupled to an upper portion of a side wall included in the body and configured to roll outwardly away from the interior region of the body.
Figure 2:
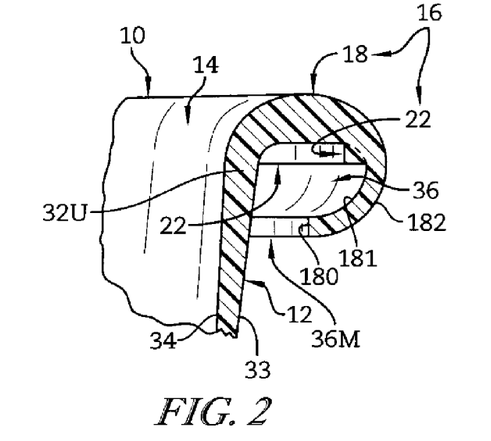
FIG. 2 is an enlarged sectional view taken along line 2-2 of FIG. 1 showing that the rolled brim includes an annular lip appended to the upper portion of the side wall and that the annular lip is arranged to curve away from the side wall so that an inner surface of the lip cooperates with an exterior surface of the side wall of the body to form an annular ridge-receiving chamber therebetween.
Figure 3:
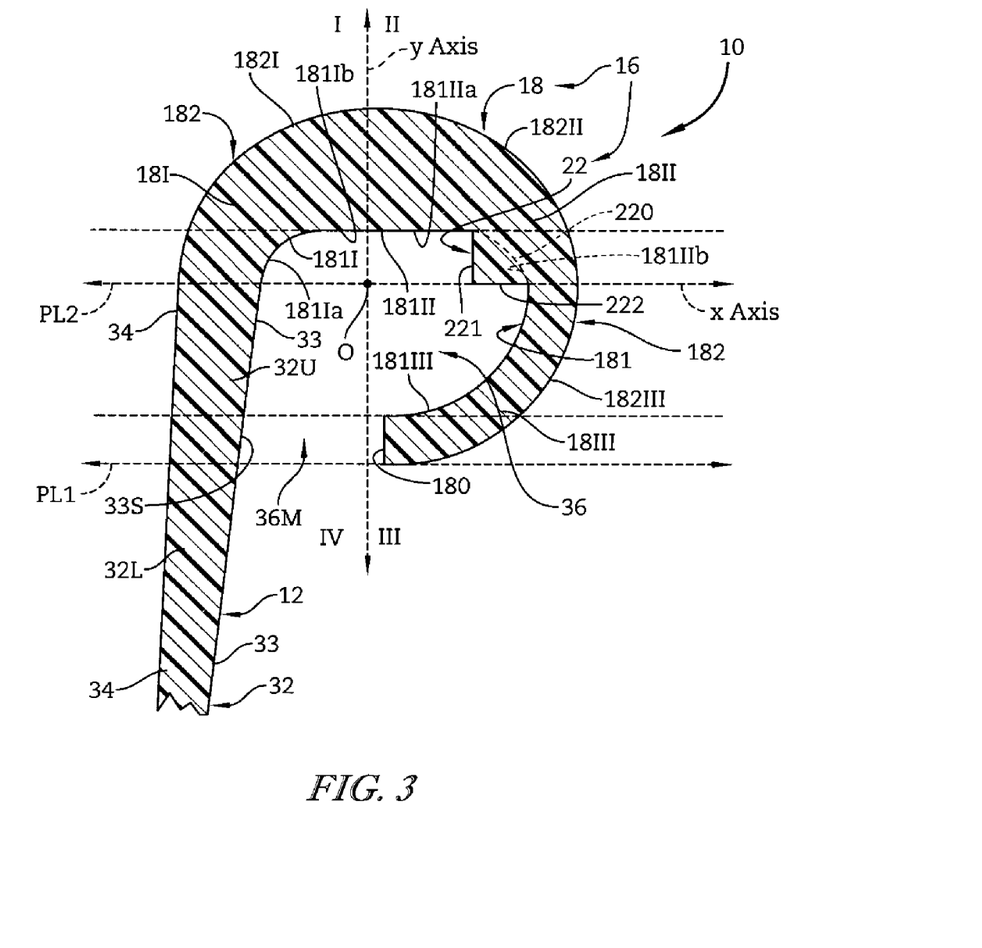
FIG. 3 is an enlarged dead section of the sectional view of FIG. 2 showing that the rolled brim also includes a quarter-round-shaped annular ridge appended to an inner lip wall of the annular lip and arranged to lie in the annular ridge-receiving chamber in spaced-apart relation to the body to provide a pivot about which the annular lip can be rolled as suggested, for example, in a progressive rim-rolling process shown in FIG. 6 to produce a rolled brim having a round shape on an exterior surface thereof.

A drink cup 10 includes a body 12 formed to include an interior region 14 and a ring-shaped rolled brim 16 made in accordance with the present disclosure and coupled to body 12 to frame an opening into interior region 14 a suggested in FIG. 1. Rolled brim 16 includes a quarter-round-shaped annular ridge as shown in FIGS. 2 and 3. As suggested in FIG. 7, a drink cup 110 includes a rolled brim 116 in accordance with another embodiment of the present disclosure. Rolled brim 116 includes an ellipsoid-shaped annular ridge 122.

Rolled brim 16 includes an annular lip 18 and an annular ridge 22 coupled to an inner wall 181 of annular lip 18 as suggested in FIGS. 2 and 3. Annular ridge 22 is coupled to inner lip wall 181 of annular lip and arranged to extend into an exterior ridge-receiving chamber 36 formed between inner lip wall 181 and an exterior surface of body 12 as suggested in FIGS. 2 and 3 and away from a curved outer lip wall 182 of annular lip 18. During formation of rolled brim 16, annular lip 18 can be rolled around a pivot provided by annular ridge 22 using, for example, a progressive die as suggested in FIG. 6 to produce a rolled brim 16 having a round shape on an exterior surface thereof as shown in FIGS. 1 and 2. Rolled brim 16 is produced in accordance with the present disclosure to have a substantially uniform cross-sectional profile as suggested in FIGS. 1-3.

Annular ridge 22 has a quarter-round shape in accordance with a first embodiment of the present disclosure as shown in FIG. 2. An annular ridge 222 included in a rolled brim 216 has an ellipsoid shape in accordance with the present disclosure as suggested in FIG. 7. Each of annular ridges 22, 222 cooperates with a companion annular lip 18 to maintain a substantially uniform radius of curvature and convex shape (in cross-section) of curved outer lip wall 182 of annular lip 18 to provide a rolled brim 16 or 216 with a substantially uniform cross-sectional profile as suggested in FIGS. 3 and 7.

Body 12 of drink cup 10 includes a floor 30 and a side wall 32 extending upwardly from floor 30 and mating with annular lip 18 as suggested in FIG. 1. Side wall 32 and floor 30 cooperate to form interior region 14 to provide a fluid-holding reservoir in body 12. Side wall 32 includes an exterior surface 33 facing outwardly away from interior region 14 and an interior surface 34 facing inwardly toward interior region 14 as suggested in FIG. 1.

Annular lip 18 includes an annular distal end 180, an inner lip wall 181 extending from an upper edge of distal end 180 to an upper edge of interior surface 34 of side wall 32, and an outer lip wall 182 extending from a lower edge of distal end 180 to an upper edge of exterior surface 33 of side wall 32 as suggested in FIG. 3. Outer lip wall 182 has a convex curved shape as shown, for example, in FIG. 3.

Side wall 32 of body 12 includes an upper portion 32U that is arranged to be surrounded by annular lip 18 and terminate at a first partition line PL1 and a lower portion 32L that is coupled to upper portion 32U at first partition line PL1 and extend downwardly to mate with a perimeter edge of floor 30 as suggested in FIGS. 1 and 3. Upper portion 32U of side wall 32 mates with annular lip 18 at a higher second partition line PL2 as suggested in FIG. 3.

Annular ridge 22 is located in a downwardly opening ridge-receiving chamber 36 which is formed in an upper end of drink cup 10 in a space provided outside of interior region 14 and between exterior surface 33 of upper portion 32U of side wall 32 and inner lip wall 181 of annular lip 18 as shown, for example, in FIG. 3. Annular ridge 22 is coupled to inner lip wall 181 and arranged to lie in ridge-receiving chamber 36 and in spaced-apart relation to an annular mouth 36M of ridge-receiving chamber 36 defined between a section 33S of the exterior surface 33 of upper portion 32U of side wall 32 and the surrounding annular distal end 180 of annular lip 18 as shown, for example, in FIG. 3.

Annular ridge 22 is coupled to inner lip wall 181 as shown in FIGS. 2 and 3. Annular ridge 22 is arranged to lie in downwardly opening ridge-receiving chamber 36 to provide pivot means for establishing a pivot about which annular lip 18 is rolled during exposure of annular lip 18 to, for example, a progressive die 120 as suggested in FIGS. 5 and 6 to produce as a container 11 comprising body 12, annular lip 18, and annular ridge 22 is run through progressive die 120 to produce rink cup 10. Drink cup 10 is thus formed to cause an outer lip wall 182 included in annular lip 18 and arranged to face outwardly away from inner annular lip 18 to have a round shape as shown, for example, in FIG. 3.

An illustrative cross-sectional shape of rolled brim 16 is shown in FIG. 3. Annular lip 18 is a monolithic element comprising, in series, three segments 18I, 18II, and 18III as suggested in FIG. 3. First segment 18I is coupled to upper portion 32U of side wall 32 of body 12. Third segment 18III surrounds upper portion 32U of side wall 32 and includes annular distal end 180 of annular lip 18. Second segment 18II interconnects first and third segments 18I, 18III. Annular ridge 22 is coupled to second segment 18II of annular rim 18 and cooperates with annular rim 18 to form rolled brim 16 as a monolithic element. Rolled brim 16 cooperates with body 12 to form a monolithic element defining drink cup 10.

Intersecting x-axis and y-axis reference lines are provided on FIG. 3 to divide the illustrated cross-section of rolled brim 16 and upper portion 32U of side wall 32 into four quadrants disposed about an origin O located at the intersection of the x-axis and y-axis reference lines. First segment 18I of annular rim 18 is located in a first quadrant (I). Second segment 18II of annular rim 18 and annular ridge 22 are located in a second quadrant (II). Third segment 18III is located in a third quadrant (III). Upper portion 32 of side wall 32 of body 12 is located in a fourth quadrant (IV).

First segment 18I of annular lip 18 is bounded by a first convex curved outer surface 182I included in outer lip wall 182 and an inner surface 181I as suggested in FIG. 3. Inner surface 181I comprises a first concave curved inner surface 181Ia and a first flat inner surface 181Ib. First concave inner surface 181Ia is arranged to interconnect exterior surface 33 of upper portion 32U and first flat inner surface 181Ib as shown in FIG. 3.

Second segment 18II of annular lip 18 is bounded by a second convex curved outer surface 182II included in outer lip wall 182 and an inner surface 181II as suggested in FIG. 3. Inner surface 181II comprises a second flat inner surface 181IIa and a second concave inner surface 181IIb (shown in phantom). Second flat inner surface 181IIa is coupled to first flat inner surface 181I and arranged to lie in coplanar relation thereto in an illustrative embodiment.

Annular ridge 22 of rolled brim 16 has a quarter-round shape and includes a convex curved surface 220 mating with second concave inner surface 181IIb. Annular ridge 22 also includes a cylindrical first exterior surface 221 and an annular second exterior surface 222. These first and second exterior surfaces 221, 222 meet at a common (annular) edge and face outwardly into ridge-receiving chamber 36 as shown, for example, in FIG. 3. Second exterior surface 222 is annular and arranged to lie in parallel relation to second flat inner surface 181IIa. First exterior surface 221 is annular and arranged to interconnect and lie in perpendicular relation to each of second flat inner surface 181IIa and second exterior surface 222.

Third segment 8III of annular lip 18 is bounded by annular distal end 180, a third convex curved outer surface 182III included in outer lip wall 182, and a third concave curved inner surface 181III. Annular distal end 180 is arranged to interconnect free edges of third convex curved outer surface 182III and concave curved inner surface 181III. Third convex outer surface 182III is arranged to interconnect a lower edge of annular distal end 180 and second convex curved outer surface 182II. Third concave curved inner surface 181III is arranged to interconnect an upper edge of annular distal end 180 and first planar surface 221 as shown in FIG. 3. Annular ridge 22 is arranged to interconnect annular flat inner surface 181IIa provided on second segment 18II and concave curved surface 181III provided on third segment 18III as suggested in FIG. 3.

First, second, and third convex curved outer surfaces 182I, 182II, and 182III have a common center of curvature and cooperate to subtend an angle of about 270° in an illustrative embodiment as suggested in FIG. 3. These surfaces 182I, 182II, and 182III cooperate to define an outer lip wall 182 characterized by a round shape as suggested in FIG. 3. Third convex outer surface 182III and third concave inner surface 181III share a common center of curvature in an illustrative embodiment. First and second flat inner surfaces 181Ib and 181IIa are annular and substantially coplanar in an illustrative embodiment.

Figures 4A, 4B:
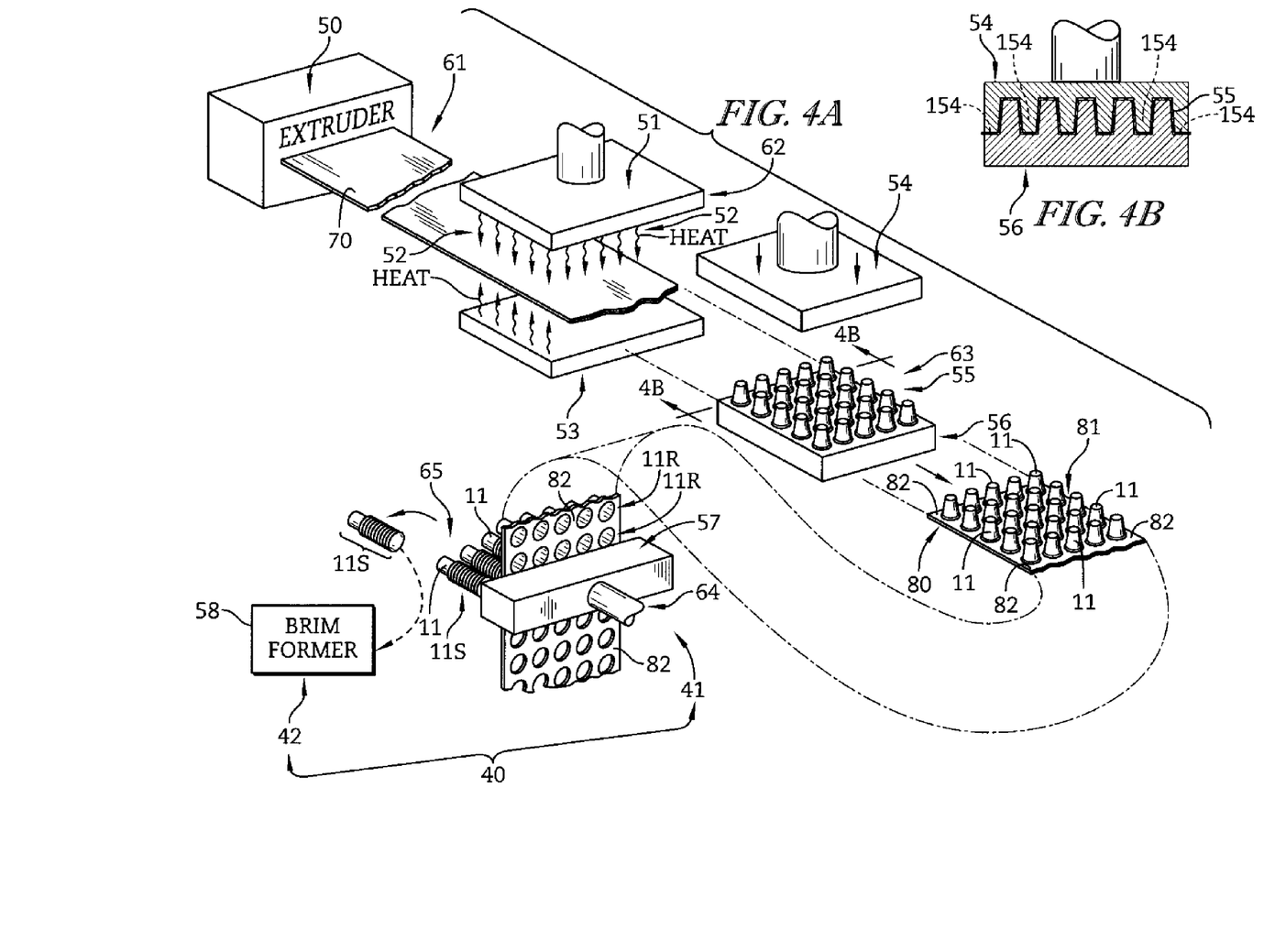
Figure 5:
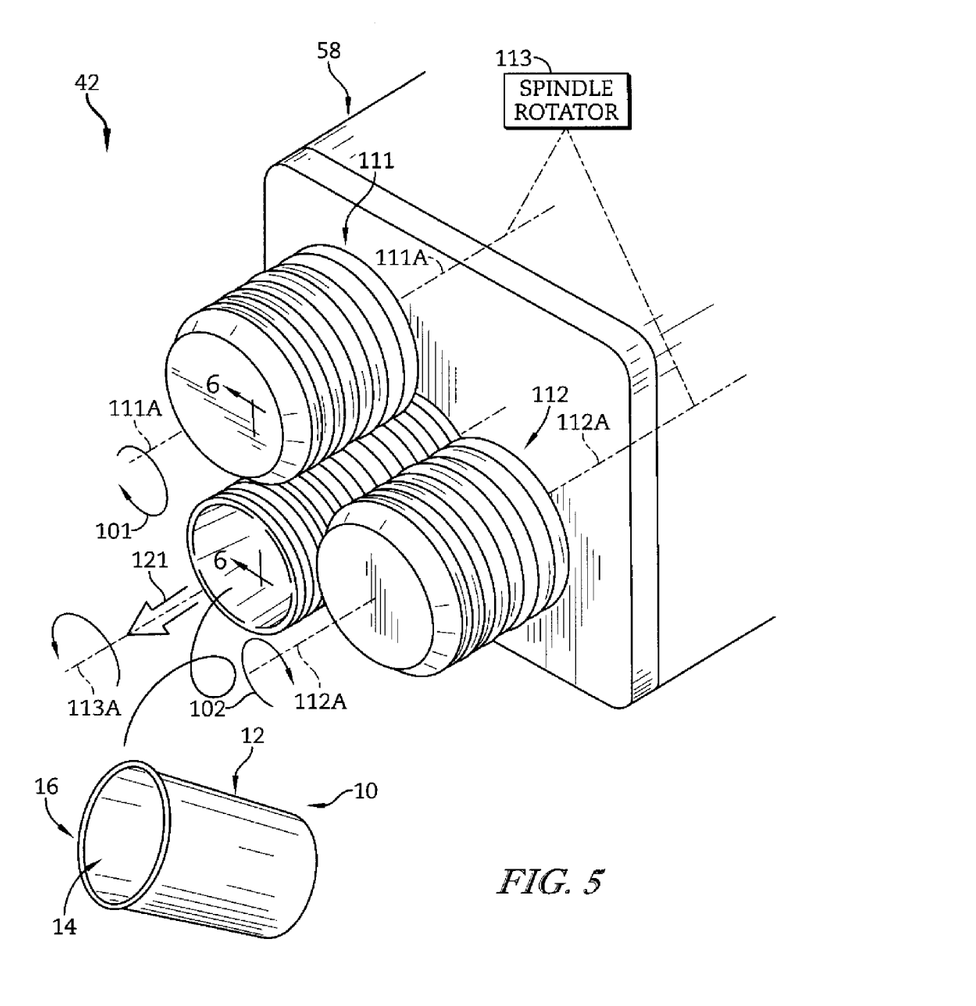
Figure 6:
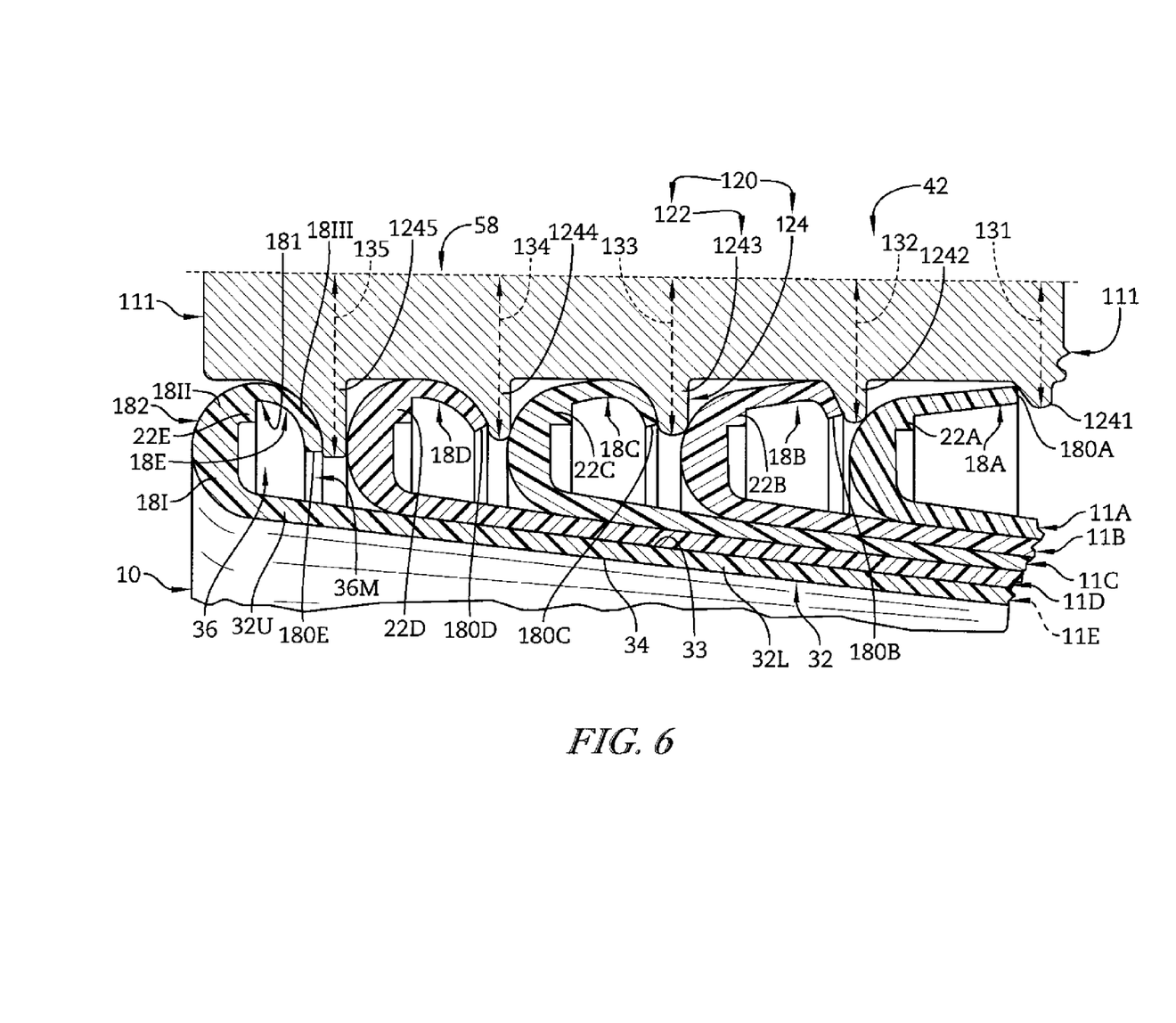
FIG. 6 is a sectional view taken about line 6-6 of FIG. 5 showing a series of five containers included in a container stack moving from right to left to engage a progressive die made in accordance with the present disclosure during the brim-forming process of the drink-cup manufacturing process and showing that a rotating spindle having a helical thread with a progressively larger diameter engages a rightwardly extending distal end of the annular lip to cause the distal end of the lip to roll about the quarter-round-shaped annular ridge to move toward the upper portion of the side wall of the body so that a rolled brim having a rounded exterior surface in accordance with the present disclosure is established and the drink cup is formed.

Drink cup 10 is formed using an illustrative drink cup manufacturing process 40 in accordance with the present disclosure which includes a container-manufacturing process 41 shown, for example, in FIG. 4A and a brim-forming process 42 shown diagrammatically in FIG. 4A and illustratively in FIGS. 5 and 6. A container 11 is formed during container-manufacturing process 41. Container 11 is a precursor to drink cup 10 as suggested in FIGS. 4A and 6. Container 11 includes a body 12 and an unrolled brim 15 as shown, for example, in FIG. 6. The unrolled brim 15 is rolled in the brim-forming process 42 to produce a rolled brim 16 including an annular lip 18 and an annular ridge 22. Drink cup 10 is formed as a result of completing, in series, container-manufacturing process 41 and brim-forming process 42 as suggested in FIG. 4A.

Container-manufacturing process 41 includes a series of steps used to make a container 11 having an unrolled brim 15 as shown in FIGS. 4A and 4B. Container-manufacturing process 41 includes, in series, an extrusion step 61, a heating step 62, a molding step 63, a stamping step 64, and an accumulating step 65. Extrusion step 61 extrudes a continuous sheet 70 made of a plastics material. Heating step 62 heats continuous sheet 70. Molding step 63 molds continuous sheet 70 into a continuous molded sheet 80 that includes a set (e.g., array) 81 of containers 11 and a container-carrier sheet 82 coupled to each container 11. Stamping step 64 separates containers 11 from container-carrier sheet 82. Accumulating step 65 accumulates containers 11 to produce several stacks 11S of nested containers 11 as shown in FIGS. 4A and 5. Each stack 11S of nested containers 11 is then transported to a brim-former station 142 wherein the brim-forming process 42 is carried out to convert each container 11 into a drink cup 10 by rolling unrolled brim 15 as suggested in FIG. 6 to produce a rolled brim 16.

Extrusion step 62 is accomplished by extruding a continuous sheet 70 as shown in FIG. 4A. An extruder machine 50 is supplied with raw pellets made of a suitable plastics material which are then heated and formed to produce continuous sheet 70. As an example, continuous sheet 70 is formed at a given rate and sufficient thickness to support downstream processes such as heating step 62 and molding step 63.

Heating step 62 is accomplished illustratively by passing continuous sheet 70 through a channel 52 formed between an upper heater 51 and a companion lower heater 53 as shown in FIG. 4A. Upper and lower heaters 51, 53 cooperate to apply heat to continuous sheet 70 to cause continuous sheet 70 to be heated to a temperature appropriate for thermoforming in molding step 63.

Molding step 63 is accomplished by positioning a portion of continuous sheet 70 in an illustrative mold cavity 55 formed between an upper female mold core 54 and a companion lower male mold core 56 as suggested in FIG. 4B. During molding step 63, cores 54 and 56 move toward one another to form a continuous molded sheet 80 as illustrated in FIG. 4A. An annular notch 154 is provided in female mold core 54 as suggested diagrammatically in FIG. 4B and annular ridge 22 is formed in notch 154 during molding step 63. Continuous molded sheet 80 includes a set 81 of individual containers 11 and a container-carrier sheet 82 coupled to containers 11 as shown in FIG. 4A. Each container 11 includes an annular ridge 22 as suggested in FIG. 6. After molding step 63 is completed, mold cores 54 and 56 move apart from one another and continuous molded sheet 80 moves in a downstream direction toward a stamping machine 57.

Stamping step 64 is performed by moving continuous molded sheet 80 through a stamping machine 57 where containers 11 are separated from container-carrier sheet 82 as shown in FIG. 4A. As an example, each row 11R of containers 11 are separated one at a time. However, containers 11 from several rows 11R may be separated from container-carrier sheet 82 by stamping machine 57. After containers 11 are freed from container-carrier sheet 82, they are then ready to be accumulated in accumulating step 65.

Accumulating step 65 is accomplished by nesting each individual container 11 in a neighboring container 11 so that a container stack 11S is established. As an example, containers 11 are nested in one another by operation of stamping machine 57 as shown in FIG. 4A. Exemplary stamping machine 57 creates five separate container stacks 11S. After each container stack 11S includes a sufficient number of containers 11, container stack 11S is transported to a brim-former machine 58 as suggested in FIG. 4A and shown in FIG. 5.

Rolled brim 16 is formed on each container 11 in brim-forming process 42 as shown in FIGS. 5 and 6. Brim-forming process 42 is accomplished by passing container stack 11S through a brim-former machine 58 as illustrated in FIG. 5.

Brim-former machine 58 includes a first rotating spindle 111, a second rotating spindle 112 and a spindle rotator 113 coupled to first and second rotating spindles 111, 112. As shown in FIG. 5, first rotating spindle 111 rotates about a first axis 111A in a clockwise direction 101 and second rotating spindle 112 rotates about a second axis 112A in clockwise direction 101. First and second rotating spindles 111, 112 engage container stack 11S to cause container stack 11S to rotate about a third axis 113A in a counter-clockwise direction 102 to cause container stack 11S to be drawn through brim-former machine 58 so that rolled brim 16 is formed progressively on each container 11 to establish drink cup 10 as suggested in FIG. 6.

As shown in FIGS. 5 and 6, container stack 11S is moving from right to left in a process direction 121 through brim-former machine 58. As illustrated in FIG. 6, container stack 115 includes at least a series of four containers 11A, 11B, 11C, 11D, and 11E. Each container 11 in container stack 11S engages a progressive die 120 included in each rotating spindle 111, 112. As illustrated in FIG. 6, progressive die 120 includes a cylindrical body 122 and a helical thread 124 coupled to the cylindrical body 122 to move therewith. Helical thread 124 is configured to have a progressively larger diameter from right to left as shown in FIG. 6. Rolled brim 16 is formed as a result of helical thread 124 engaging distal end 180 and various sections of outer lip wall 182 of annular lip 18 to cause distal end 180 and other portions of annular lip 18 to bend about a pivot established by annular ridge 22 toward upper portion 32U of side wall 32 of body 12. After rolled brim 16 has been formed on container 11, drink cup 10 is established as suggested in FIGS. 5 and 6.

As an example, container stack 11S moves through brim-former machine 58 and container 11A of container stack 11S engages a first thread 1241 which has a first thread radius 131. First thread 1241 supports distal end 46A of annular lip 18A as container 11A moves along helical thread 124. Container 11B has engaged a second thread 1242 which has a relatively larger second thread radius 132. As a result of second thread 1242 having larger second thread radius 132, force is applied to distal end 180 and outer lip wall 182 of third segment 18III of annular lip 18 of container 11B to cause non-elastic deformation of annular lip 18B so that distal end 180B pivots about quarter-round ridge 22B towards exterior surface 33 of body 12B. Container 11C has engaged a third thread 1243 which has a relatively larger third thread radius 133 that causes additional force to be applied to distal end 180C of container 11C and to outer lip wall 182 of third segment 18III of annular lip 18C so that third segment 18III pivots about quarter-round ridge 22C. Container 11D has engaged a fourth thread 1244 which has a relatively larger fourth thread radius 134. Fourth thread radius 134 causes even more force to be applied to distal end 11D and outer lip wall 182 of third segment 18III of annular lip 18C so that third segment 18III continues to pivot about quarter-round ridge 22D as shown in FIG. 6. Finally, container 11E engages a fifth thread 1245 which has a relatively larger fifth thread radius 135. Fifth thread radius 135 provides the remaining force necessary to move distal end 180E from the frustoconical shape of container 11A to the rounded shape of container 11E so that rolled brim 16 is established and drink cup 10 is formed as a result.

Quarter-round ridge 22 cooperates with helical thread 124 of brim-former machine 58 to control inelastic deformation of annular lip 18. Inelastic deformation occurs as a result of helical thread 124 applying force to distal end 180 and third segment 18III of annular lip 18. As helical thread 124 applies force, third segment 18III of annular lip 18 pivots about quarter-round ridge 22 toward exterior surface 33 of body 12. Helical thread 124 maintains force applied to annular lip 18 as container 11 moves through brim-former machine 98. As a result, inelastic deformation of annular lip 18 happens over time and is maintained by support from helical thread 124. As shown in FIG. 6, rolled brim 16 is formed after fiver rotations of rotating spindle 111, but may be accomplished with any suitable number of rotations.

Figure 7:
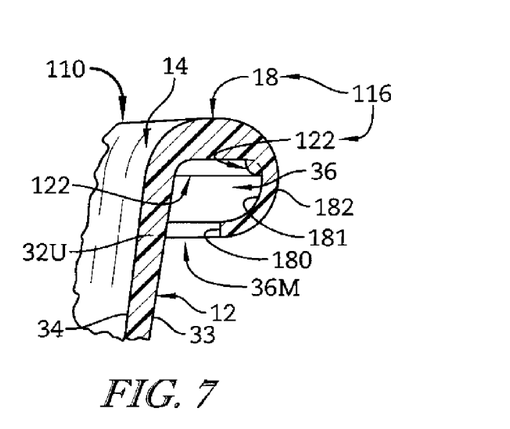
FIG. 7 is a view similar to FIG. 3 showing a portion of a drink cup in accordance with a second embodiment of the present disclosure in which a rolled brim included in the drink cup includes a lip and an ellipsoid-shaped annular ridge appended to an inner lip wall of the annular lip and arranged to lie in spaced-apart relation to a body of the drink cup.

A second embodiment of a rolled brim 216 in accordance with the present disclosure is shown in FIG. 7. As an example, rolled brim 216 includes an annular lip 18 and an ellipsoid ridge 222 coupled to inner lip wall 181 of annular lip 18 and positioned to lie in ridge-receiving chamber 36.

The invention claimed is:

1. A drink cup comprises
a body formed to include an interior region providing a fluid-holding reservoir and
a rolled brim coupled to the body to frame an opening into the interior region, wherein the rolled brim includes an annular lip coupled to an upper portion of the body and arranged to lie outside of the interior region and surround the upper portion of the body to define a downwardly opening ridge-receiving chamber therebetween and an annular ridge coupled to an inner lip wall of the annular lip and arranged to lie in the downwardly opening ridge-receiving chamber to provide pivot means for establishing a pivot about which the annular lip is rolled during exposure of the annular lip to a progressive die as a container comprising the body, annular lip, and annular ridge is run through the progressive die to produce the drink cup so that an outer lip wall that is included in the annular lip and that is arranged to face outwardly away from the inner lip wall of the annular lip has a round shape
wherein the annular lip terminates at a distal end and includes a first segment coupled to the upper portion of the body, a third segment configured to include the distal end, and a second segment arranged to interconnect the first and third segments and coupled to the annular ridge, and the annular ridge is arranged to extend away from the inner lip wall of the annular lip and into the ridge-receiving chamber in a direction toward the upper portion of the body.

2. The drink cup of claim 1, wherein each of the first, second, and third segments is bounded by a convex curved outer surface and the convex curved outer surfaces of the first, second, and third segments cooperate to define the outer lip wall characterized by the round shape.

3. The drink cup of claim 2, wherein the inner lip wall includes an annular flat inner surface provided on the second segment and a concave curved surface provided on the third segment and the annular ridge is arranged to interconnect the annular flat inner surface and the concave curved surface.

4. The drink cup of claim 1, wherein the inner lip wall includes an annular flat inner surface provided on the second segment and a concave curved surface provided on the third segment and the annular ridge is arranged to interconnect the annular flat inner surface and the concave curved surface.

5. The drink cup of claim 1, wherein a portion of the inner lip wall of the annular lip included in the first segment comprises a first concave surface and a first flat inner surface and the first concave inner surface is arranged to interconnect an exterior surface of the upper portion of the body and the first flat inner surface, another portion of the inner lip wall of the annular lip included in the second segment comprises a second flat inner surface, the first flat inner surface is arranged to interconnect the first concave surface and the second flat inner surface, and the second flat inner surface is arranged to interconnect the first flat inner surface and annular ridge.

6. The drink cup of claim 5, wherein the annular ridge includes a cylindrical first exterior surface and an annular second exterior surface, the cylindrical first exterior surface is arranged to interconnect second flat inner surface and annular second exterior surface, and the annular second exterior surface is arranged to interconnect the cylindrical first exterior surface and a further portion of the inner lip wall of the annular lip included in the third segment.

7. The drink cup of claim 6, wherein the annular second exterior surface of the annular ridge is arranged to lie in a plane that is arranged to lie in spaced-apart parallel relation to the second flat inner surface.

8. The drink cup of claim 6, wherein the further portion of the annular lip included in the third segment is a concave curved inner surface arranged to face toward the first concave curved inner surface.

9. The drink cup of claim 6, wherein the cylindrical first exterior surface of the annular ridge is orthogonal to each of the second flat inner surface and to the annular second exterior surface.

10. The drink cup of claim 5, wherein the annular ridge includes first and second exterior surfaces that meet at a common edge and face outwardly into the ridge-receiving chamber.

11. The drink cup of claim 10, wherein the first exterior surface is cylindrical.

12. The drink cup of claim 11, wherein the first exterior surface is orthogonal to the second flat inner surface.

13. The drink cup of claim 10, wherein the second exterior surface is annular.

14. The drink cup of claim 13, wherein the second exterior surface is flat and arranged to lie in a plane that is arranged to lie in spaced-apart parallel relation to the second flat inner surface.

15. A drink cup comprises
a body including a floor and a side wall extending upwardly from the floor and cooperating with the floor to form an interior region providing a fluid-holding reservoir,
an annular lip including a distal end, an inner lip wall extending from the distal end to an exterior surface of an upper portion of the side wall and cooperating with the exterior surface of the upper portion of the side wall to form a downwardly opening ridge-receiving chamber, and an outer lip wall extending from the distal end to an interior surface of an upper portion of the side wall and having a round shape with a substantially uniform radius of curvature from the distal end to the upper portion, the lip having a first segment coupled to the side wall, a third segment comprising the distal end of the lip and a second segment between the first and third segments, and
an annular ridge coupled to the inner lip wall to lie in the ridge-receiving chamber spaced from the side wall and arranged to extend from the second segment away from the inner lip wall into the ridge-receiving chamber.

16. A drink cup comprises
a body including a floor and a side wall extending upwardly from the floor and cooperating with the floor to form an interior region providing a fluid-holding reservoir,
an annular lip including a distal end, an inner lip wall extending from the distal end to an exterior surface of an upper portion of the side wall and cooperating with the exterior surface of the upper portion of the side wall to form a downwardly opening ridge-receiving chamber, and an outer lip wall extending from the distal end to an interior surface of an upper portion of the side wall and having a round shape, and
an annular ridge coupled to the inner lip wall to lie in the ridge-receiving chamber and arranged to extend outwardly away from the inner lip wall into the ridge-receiving chamber,
wherein the inner lip wall includes a flat inner surface providing a portion of a boundary of the ridge-receiving chamber and a concave curved surface providing another portion of the boundary of the ridge-receiving chamber and the annular ridge is arranged to interconnect the flat inner surface and the concave curved surface.

17. The drink cup of claim 16, wherein the annular ridge includes first and second exterior surfaces that meet at a common edge and face outwardly into the ridge-receiving chamber.

18. The drink cup of claim 17, wherein the first exterior surface has a cylindrical shape and mates with the flat inner surface and the second exterior surface has an annular shape and mates with the concave curved surface.

19. A drink cup comprises
a body formed to include an interior region providing a fluid-holding reservoir and
a rolled brim coupled to the body to frame an opening into the interior region, wherein the rolled brim includes an annular lip coupled to an upper portion of the body and arranged to lie outside of the interior region and surround the upper portion of the body to define a downwardly opening ridge-receiving chamber therebetween and an annular ridge coupled to an inner lip wall of the annular lip, spaced apart from the upper portion of the body, and arranged to lie in the downwardly opening ridge-receiving chamber to provide pivot means for establishing a pivot about which the annular lip is rolled during exposure of the annular lip to a progressive die as a container comprising the body, annular lip, and annular ridge is run through the progressive die to produce the drink cup so that an outer lip wall that is included in the annular lip and that is arranged to face outwardly away from the inner lip wall of the annular lip has a round shape and a substantially uniform radius of curvature from a distal end of the annular lip to the upper portion of the body.

\* \* \* \* \*